(12) United States Patent
Gong

(10) Patent No.: US 8,538,233 B2
(45) Date of Patent: Sep. 17, 2013

(54) AUTOMATIC CAMERA IDENTIFICATION FROM A MULTI-CAMERA VIDEO STREAM

(75) Inventor: Ximin Gong, Belle Mead, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 106 days.

(21) Appl. No.: 13/216,446

(22) Filed: Aug. 24, 2011

(65) Prior Publication Data

US 2013/0051763 A1  Feb. 28, 2013

(51) Int. Cl.
*H04N 5/77* (2006.01)

(52) U.S. Cl.
USPC .......................................... 386/223; 386/226

(58) Field of Classification Search
USPC .......................... 386/223, 224, 242, 226, 230
See application file for complete search history.

(56) References Cited

U.S. PATENT DOCUMENTS 8,054,330 B2 * 11/2011 Shu et al. ...................... 348/143
2011/0128382 A1 * 6/2011 Pennington et al. .......... 348/153

* cited by examiner

*Primary Examiner* — Robert Chevalier
(74) *Attorney, Agent, or Firm* — Fay Kaplun & Marcin, LLP

(57) ABSTRACT

An apparatus and method for receiving a current video frame of a program video having a plurality of scene cuts switching between video segments originating from respective cameras of a plurality of cameras and automatically identifying the camera from which the current video frame originated. The apparatus having a feature database storing predetermined features for a plurality of cameras filming a program video originating from the plurality of cameras, a recognition unit receiving a current video frame of the program video, extracting features from the current video frame, and comparing the features to the previously stored features and a camera model estimator computing an estimated camera model based on corresponding feature pairs and previously stored features, wherein if the estimated camera model is within a predetermined threshold of a stored camera model for one of the plurality of cameras, that camera is identified as originating the current video frame.

19 Claims, 4 Drawing Sheets

PRIOR ART

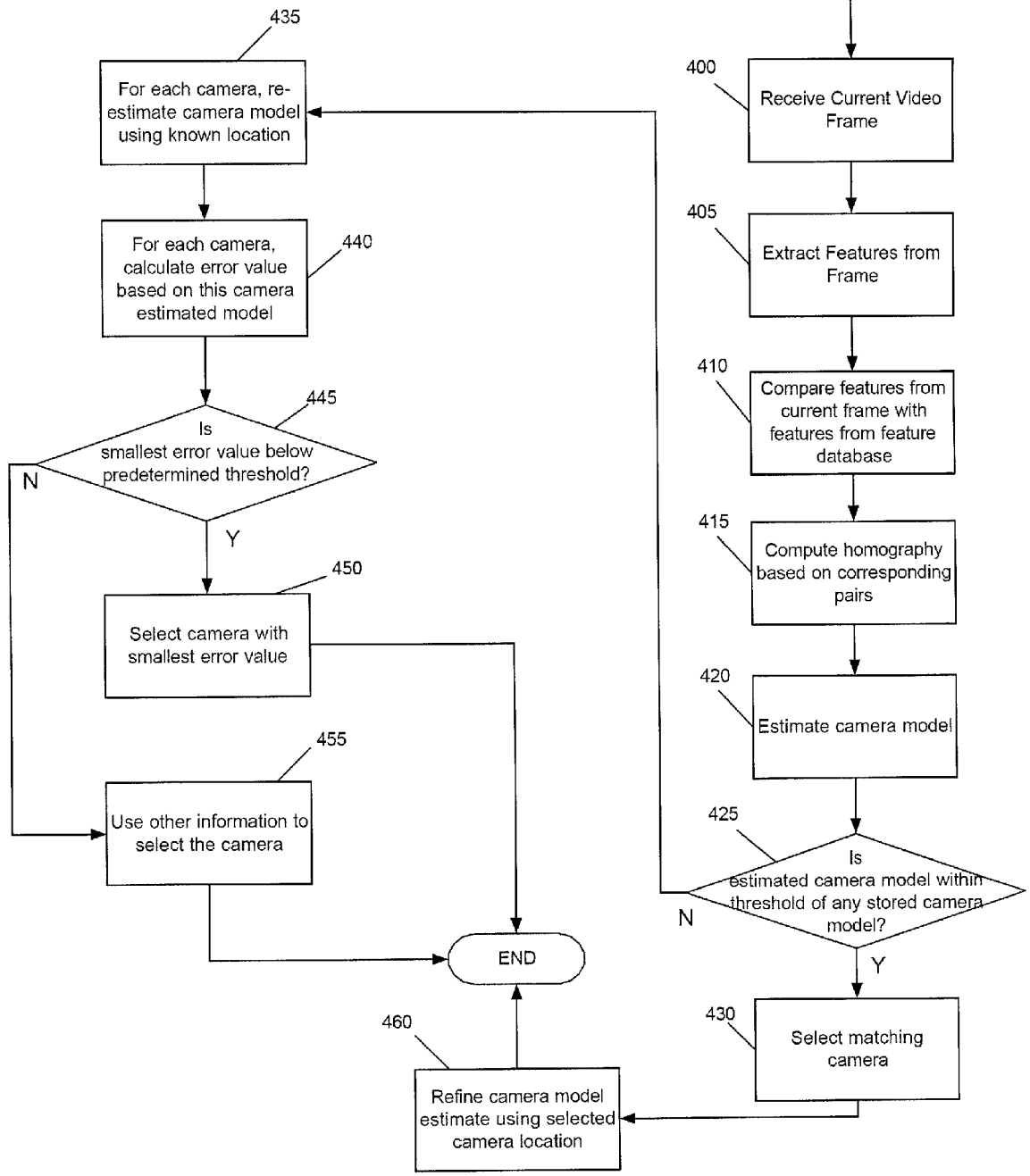

AUTOMATIC CAMERA IDENTIFICATION FROM A MULTI-CAMERA VIDEO STREAM

FIELD OF THE INVENTION

This invention relates to the improved performance of devices for inserting realistic indicia into video sequences, and particularly, to the prevention of delays in the insertion of such realistic indicia when the video sequence cuts from one camera view to another camera view in a multi-camera system.

BACKGROUND INFORMATION

Systems for inserting electronic images into live video signals, such as described in U.S. Pat. Nos. 5,264,933 and 5,543,856 to Rosser, et al. and U.S. Pat. No. 5,491,517 to Kreitman et al., which are hereby incorporated by reference in their entirety, have been developed and used commercially for the purpose of inserting advertising and other indicia into video sequences, including live broadcasts of sporting events. These systems are called Live Video Insertion Systems ("LVIS"). To varying degrees of success, these systems seamlessly and realistically incorporate indicia into the original video in real time. Realism is maintained even as the original scene is zoomed, panned, or otherwise altered in size or perspective.

Live video insertion of indicia requires several steps. The event video must be recognized and tracked to obtain the camera perspective. The indicia have to be adjusted to match this camera perspective and potential occluding objects have to be detected prior to the actual insertion. In the systems discussed in U.S. Pat. No. 5,264,933 by Rosser, et al. and U.S. Pat. No. 5,491,517 by Kreitman et al. it was assumed that the broadcaster would perform the complete process, including recognition, tracking, creating an occlusion mask, warping inserts to correctly match the current image, and correctly mixing the original video, warped insert and occlusion mask.

FIG. 1 shows a simplified illustration of a conventional multi-camera system employing an LVIS. In this example, the multi-camera system is televising a tennis match. A plurality of cameras 12 is deployed around the tennis court 10 in order to provide different views of the match. The output of each camera 12 is supplied to a video production switcher 14 located on-site (e.g., in a production truck at the sporting venue), where a director creates a broadcast program from the feeds provided by the cameras 12. As the tennis match progresses, the director switches between camera feeds to create the broadcast program. For instance, when a player is serving, the director may select the feed from one of the cameras, and at a later point in the match, perhaps as the players are preparing for the next serve, the director may cut to the feed of a different camera to provide the viewer with a different view of the court 10.

Each camera 12 is provided with its own LVIS 13, an example of which is illustrated in FIG. 2. The various operations of these LVIS components are described in U.S. Pat. Nos. 5,264,933 and 5,543,856, as well as U.S. Pat. Nos. 5,892,554; and 5,953,076. Each LVIS 13 inserts indicia into the scene that is being filmed by its associated camera 12. Thus, as the director composes the broadcast of the tennis match, the feeds the director is working with already include the indicia inserted at its proper location.

Next, the indicia enhanced program is transmitted 30 to the end user 42 via, for example, satellite, cable, or fibers. On a television or any other display device 58, the viewer sees an advertisement logo AD1 on the tennis court 10. Although in reality the logo is not on the tennis court, the logo AD1 appears on the television screen seamlessly and realistically, as if the logo AD1 had actually been placed on the court, since it has been warped to account for the perspective of the specific camera view being shown, and since the players occlude the logo (instead of being covered by it) as they run over it during their match.

As explained above, the broadcast program is a sequence of different scene cuts. The program may show the view of a first camera, then cut to a second camera, return to the first camera, and cut to a third camera. The specific sequence of camera views is at the discretion of the director, who is provided at the production switcher 14 with feeds of all the cameras. Since the camera feeds already include the inserted indicia when they arrive at the production unit 14, a scene cut from a current view to a new view will not delay the appearance of the logo in the new view. The appearance of the logo in the new scene will be seamless.

FIG. 1 is an example of a system in which the video processing for indicia insertion occurs upstream of the production switcher. Since one LVIS is employed for each camera, the camera identification is known and constant during the broadcast. Thus, in the composed program created by the director from the various enhanced video feeds, the inserted logos will appear immediately after every scene cut. The immediate appearance of an inserted logo at every scene cut preserves the intended verisimilitude of the logo appearing in the video image as if it is actually a part of the real world surface being filmed. However advantageous such an approach may be from the perspective of preventing logo insertion delays at every scene cut, sometimes, for reasons such as reducing system and operation footprint, cost, or any other reasons that are unrelated to logo insertion, it is more desirable to insert the indicia downstream of the production switcher 14.

In contrast to the system of FIG. 1, FIG. 2 shows an arrangement where the LVIS 230 is downstream to the production switcher 220. In a downstream logo insertion system, the cameras 210a-c do not have their own respective LVIS's. Instead, one LVIS 230 is employed downstream to the production switcher 220. In this downstream system, the camera feeds are supplied, without any logo insertion, to the production switcher 220, where the director composes a broadcast program consisting of a plurality of scene cuts switching among the various camera feeds. For instance, the scene cuts may transition from one camera to another in order to follow the action occurring on the field. Downstream to the production switcher 220 (either at the sporting event site or in the central production facility, to which the composed program has been sent before being broadcast to the end viewers), a single LVIS 230 handles the indicia insertions for every scene cut in the program. For instance, if the program cuts from a camera filming the sidelines to another filming the baseline in a tennis match, the LVIS 230 must insert any required logos into the current video frame with respect to this current video's camera perspective. Before a logo can be inserted into a current video image frame by an LVIS 230, the camera 210a-c that filmed the current video image must be identified, as each camera 210a-c may have different data associated with it. Camera specific data may be the camera's location, field of view, occlusion parameters, insertion parameters (e.g. camera's specific artworks or insertion location). If the program is a "live" broadcast, the operator of the LVIS must ensure that the logo insertions are turned on as quickly as possible after a scene cut so as to not destroy the impression of seamlessness and realism necessary to create the illusion that the logos are actually part of the playing surface or stadium wall. This task becomes very difficult for programs that include a great deal of rapid scene cuts, such as those of rugby games, which require the director to make frequent scene cuts in order to capture all the unpredictable, chaotic action unfolding on the field.

Thus, in this system using a single LVIS 230 for inserting indicia into downstream video images originating from a plurality of cameras 210*a-c*, as the program cuts from one scene to another, an operator at the typical downstream logo insertion system must first manually identify the camera associated with the newest scene cut, and he must do so as quickly as possible. This is shown as user input 240 on FIG. 2. At a typical video frame rate of 30 frames (60 fields) per second, a viewer may detect an insertion delay that is as short as 1 field delay ($\frac{1}{60}$ second). It would be very difficult for an operator to manually switch the camera ID without causing noticeable insertion delay (a few seconds). As a result, logo will be faded-in into the video so as to alleviate the sudden "pop" effect. There is typically a cushion of a few seconds of time where the cut camera will be held steady before it moves, making the late insertion not too visually disturbing.

Therefore, there is a need to reduce or eliminate such delays, that shatter the illusion of realism that the LVIS is intended to instill in the end viewer, even more so in video programs composed of a large sequence of rapid scene cuts.

BRIEF DESCRIPTION OF THE DRAWINGS

FIG. 4 is a flow diagram showing an exemplary operation of an automatic camera identification performed by the LVIS of FIG. 3 according to an exemplary embodiment.

DETAILED DESCRIPTION

Figure 1:
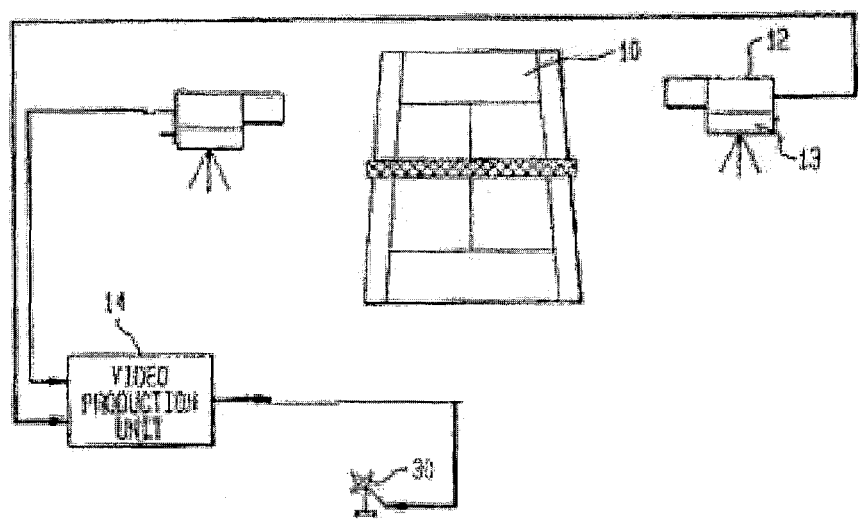
FIG. 1 shows a simplified illustration of a conventional multi-camera system with each camera employing an LVIS.
Figure 1:
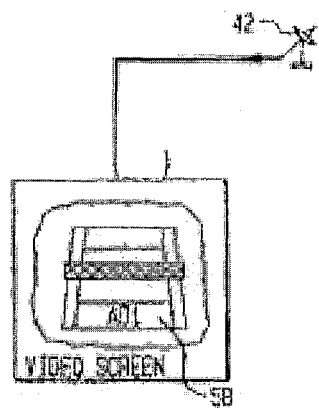

The exemplary embodiments may be further understood with reference to the following description of the exemplary embodiments and the related appended drawings, wherein like elements are provided with the same reference numerals. The exemplary embodiments are related to systems and methods for improved performance of devices for inserting realistic indicia into video sequences, and particularly, to the prevention of delays in the insertion of such realistic indicia when the video sequence cuts from one camera view to another camera view in a multi-camera system.

In the above description, it was noted that there are many examples of LVIS systems for the insertion of indicia into video sequences and the above provided several examples of such LVIS systems. However, it is noted that the exemplary embodiments are not limited to such LVIS systems. That is, as will be described in more detail below, the exemplary systems and methods may be applied to any type of LVIS system. It is also noted that in the above description and the following description, the exemplary event sites are sporting events or other remote sites. However, the exemplary embodiments are not limited to such remote event sites. It may be that the exemplary embodiments are implemented for a central production facility show that has a multi-camera system.

Figure 3:
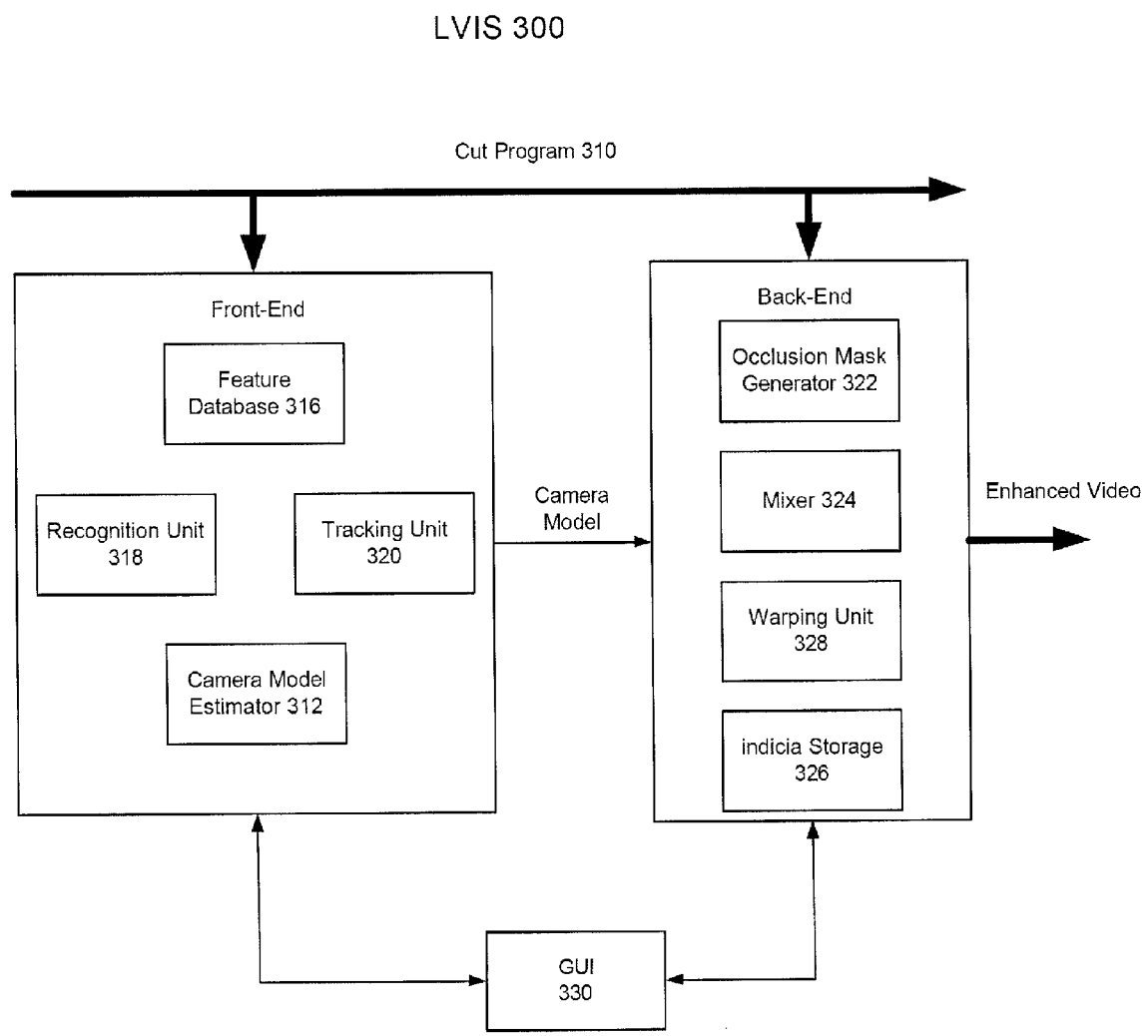
FIG. 3 shows an LVIS that performs video frame analysis to automatically identify the camera that is the source of each scene cut of a video program according to an exemplary embodiment.

FIG. 3 shows an LVIS 300 that performs video frame analysis to automatically identify the camera that is the source of each scene cut of a video program. The LVIS system 300 includes a front-end computing component and a back-end computing component. In this architecture, the front-end and back-end each represents an independent computer application that run in succession on possibly separate computer hardware devices that may be located at different locations. This modular design allows for multiple front-end units to feed one back-end unit or one front-end unit to feed multiple back-end units. The front-end computing component includes software modules including a feature database 316, a recognition unit 318, a tracking unit 320, and a camera model estimator 312. The back-end computing component includes an occlusion mask unit 322, an insertion mixer unit 324, a warping unit 328, and an indicia storage unit 326. The output (camera model) of a front-end feeds the input of a back-end. The cut program 310 is input into the recognition unit 318 and is processed by the various units in the front- and back-end components of the LVIS system 300. The processed enhanced video having an indicia inserted therein is supplied by the insertion mixer unit 324 to the next downstream unit in the system, typically a production unit switcher.

To implement the functionality of automatic camera identification, the front-end computing components include a functionality of estimating the camera model including automatically determining the current camera identification. This new LVIS 300 may be located downstream to a production unit (not shown), operating directly on the cut program video 310, at a central production facility location, for instance. In the LVIS 300 the ability to automatically identify the camera of a current video image resides in the various units of the front-end system component. However, those skilled in the art will understand that the functionality described herein for the automatic identification of the camera does not need to be located therein. That is, the functionality described herein for the automatic identification of the camera may reside in other modules of the LVIS 300 or may also be a unit that is separate from the LVIS 300 and provides camera identification information to the LVIS 300.

Prior to describing the specific automatic camera identification functionality, the general functionality of the LVIS 300 will be described. During a pre-event system calibration phase, via a GUI unit 330, features from the scene are extracted and stored in the feature database 316. These features may be any characteristic fiducials such as keypoints, lines, conics, their intersections, and their local color and texture. Typically, these features are sport specifics and are part of the known field/court 3D model, but generally any feature that uniquely characterizes a region in the scene may be used. Data associated with each feature including the 3D position and any other defining attributes are stored in the feature database 316. Before the event, in addition to a scene's features, information related to the cameras is also being collected and stored. This camera's specific information may be the camera's location, lenses' distortion parameters, occlusion parameters, insertion parameters. Some are static (e.g., location, lens distortion) while others may be periodically updated during the broadcasted event.

With respect to the automatic camera identification functionality, the feature database 316 is populated with the characteristic features of each camera location at the event site. In the context of this description the feature database 316 may be any physical and/or logical manner of storing the type of information described below. Examples of physical units include hard drives, flash memory, dynamic random access memory (DRAMs), etc. Examples of logical data stores include databases, tables, arrays, etc. The information that may be populated into the feature database 316 may include an identification code for each camera at the event site and the real world coordinates of each camera at the event site. In addition, the feature database 316 may also be populated with such other camera specific parameters and scene characteristics as 1) ranges of field of views at different zoom levels and their corresponding background images; 2) geometric entities such as lines, curves (e.g. circles or ellipse) extracted from each camera's field of view; 3) local features extracted from a small neighborhood of key-points or fiducials from each camera's field of view, with each feature representing differentiating local characteristic such as texture, color, and shape; and 4) view specific features in the scene such as graphics or text uniquely present in each camera's field of view, such as the text and numbers of an actual scoreboard or logos that are actually present in the playing surface.

As can be seen from the above examples, any information that may be used to uniquely identify that a particular camera at the event site is the source of a particular video scene may be stored in the feature database 316. The characteristic features stored are defined in 2D reference video images with associated attributes set during pre-event calibration stage. The attributes are generally their 3D position in the scene and are used to establish a relation between them and their 2D projection onto current video image space. As will be described in greater detail below, this relation, as defined by a homography, is used to estimate the current camera model. The characteristic features stored in the feature database 316 may be highly dependent on the type of event and/or may be event site specifics. For example, the characteristic features for a tennis match may be different than the characteristic features for a football game. Similarly, the characteristic features may be different for a basketball game than the characteristic features for an awards show (e.g., the Academy Awards).

Returning to the general description of the LVIS 300, generally, video is measured in terms of frames or fields. A typical video frame rate is 30 frames per second. A frame, then, consists of 2 fields (one field contains the even rows of a video frame and the other the odd rows, resulting in 60 fields per second). During the event, the main functions of the recognition unit 318 and tracking unit 320 are to extract and find corresponding features, based on which camera model is calculated by the camera model estimator 312 for each video frame. The recognition unit 318 searches for features in the current frame that can be matched with features from the feature database 316. For example, in the case of a football game, the white lines on the field may be recognized and matched with their corresponding lines from the feature database 316. The recognition process is computationally complicated and typically takes N frame to process (for example, for football N may be 1-3 frames). Therefore, to maintain the camera model estimate in between every Nth frame the tracking unit 320 tracks the image features recognized by the recognition unit 318 at the beginning of each segment of N frames. Alternatively (or in addition), the tracking unit may track scene independent features, such as image blocks with discriminative texture, as described in U.S. Pat. No. 6,529,613 to Astle which is hereby incorporated by reference in its entirety. Hence, the recognition unit 318 and tracking unit 320, continuously and jointly, find correspondence between features from the current frame and the feature database. Based on the found corresponding features, the camera model estimator 312 calculates the homography that is defined as a spatial mapping between a plane within the 3D model of the scene (e.g. the field's ground) and this plane projection in the video image. Using this homography and the camera's static data (e.g. location), the camera model estimator 312 estimates the camera model for each frame and delivers it to the back-end component.

In the back-end component, the camera model is used by the warping unit 328 to warp the indicia 326 onto an indicium image with a perspective that matches the current camera's view. The occlusion mask unit generates an occlusion mask that determines for each pixel in the current frame if it belongs to the background, and therefore, should be replaced by the corresponding indicium image's pixel or if it belongs to the foreground, and therefore, should not be replaced by the corresponding indicium image's pixel. Hence, at the mixer 324, the clean video is composed with the indicium image based on the occlusion mask.

The GUI unit 330 allows an operator to interface with the system during pre-event system setting and through the event as necessary. For example, before the event an operator usually calibrates the cameras to find the static parameters associated with each camera (e.g. camera's physical location in the field). The operator may also train the occlusion mask generator 322, finding characteristic color distinguishing between foregrounds and the background in the event's scene. Another pre-event setting relates to defining a 3D model of the event's scene (e.g. features such as the lines and circle on the field). During the game the operator may update system parameters such as the current active camera's ID. The GUI 330 may also be used to display diagnostic data derived from the various system units for the operator to monitor the system operation.

As described above, the prior art systems require the camera identity to be given (i.e., input) to the LVIS system each time a new camera's feed is cut into the program (typically, manually by the operator). In contrast, the exemplary embodiments described herein, including LVIS 300, automatically estimate the source (camera ID) of the current processed frame in the cut program. As described above, FIG. 3 represents only one possible way of illustrating the functional relations existing among the depicted units and should thus not be regarded as the only manner of implementing the exemplary embodiments described herein.

Figure 2:
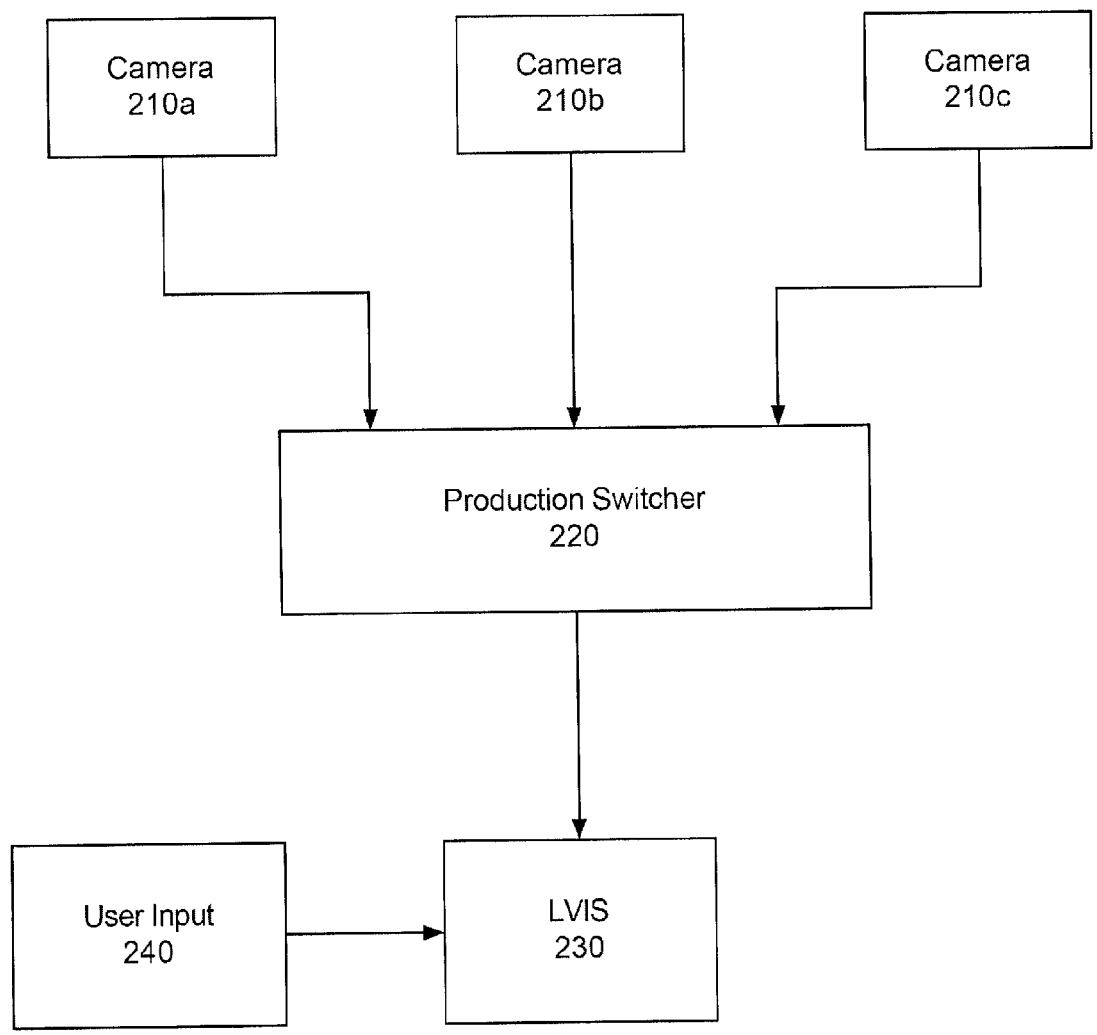
FIG. 2 shows a simplified block diagram of a system having the LVIS downstream of the production switcher in a multi-camera environment.

The input to the LVIS 300 of FIG. 3 is, as explained before, a camera feed selected by a video production switcher usually operated by a director 310. The program includes a plurality of scene cuts corresponding to video segments obtained from different cameras located at the site of an event being filmed, such as a tennis match or rugby game. Under the prior art LVIS, upon the occurrence of every scene cut a human operator would have to manually enter into the LVIS the camera ID of the current video segment before a desired indicia could be inserted at its proper location and in its proper perspective in the current video image. In the exemplary embodiments, this manual camera identification function of the LVIS of FIG. 2 is replaced by an automatic camera identification functionality, for example, by processing performed by the LVIS front-end computing component.

Once the feature database 316 has, as explained above, been populated with data characterizing the scene with respect to each camera, the LVIS 300 of FIG. 3 is ready to insert indicia into a cut program based on the automatic camera identification capability of the front-end component. These data, models and scene related features, determined before the event, are collectively referred to as the scene's features. Each camera, as a result of the pre-game calibration, is associated with its own scene's feature set. For instance, the set for camera 1 may comprise its own unique camera ID and the field of view characteristics that are particular to its own field of view.

FIG. 4 is a flow diagram of an automatic camera identification process according to an embodiment of the present invention. This method may be implemented by, for example, a camera model estimator module 312 front-end component of the system. In this exemplary embodiment, the process of FIG. 4 is performed on every incoming video frame of the composed video program. However, it may be possible to perform the process of FIG. 4 on less than the entirety of the incoming video frames. For example, known in the art scene cut detection methods detect discontinuities in the video (scene cut). Thus, if there is no scene cut occurring (due to camera switch), tracking and camera model estimating continue based on the current camera ID. Otherwise, if a scene cut occurs, then the automatic camera identification method, according to an embodiment, is expected to provide the new camera ID. Another example may be known in the art tracking algorithms that will track an object through a scene (e.g., a tennis ball or baseball). Such tracking algorithms may be used to track an object through a scene and if the object is at the expected location and appearance from frame to frame, it may be assumed that the camera identification remains the same for successive frames and therefore the exemplary automatic identification process of FIG. 4 may be simplified for one or more incoming frames. In another example, there may be some intelligence that is built into or learned by the recognition unit 318. For example, when filming a baseball game, it may be determined that when the camera that films the pitcher in the windup is identified that the video feed will remain with that camera for at least a predetermined amount of time (e.g., the average time it takes a pitch to reach a batter), and thus, for a subset of that time, the exemplary automatic identification process of FIG. 4 may be skipped because the camera feed will remain constant. Those skilled in the art will understand that there also may be other manners of determining that the exemplary process of FIG. 4 does not need to be performed on each video frame. However, as described above, in this example, it is assumed that the exemplary process of FIG. 4 is performed on every incoming frame.

According to step 400, the front-end receives a video frame of the program video that has been cut to by the director. For example, the input video frame may be the first frame of a new video segment from a camera to which the director has cut. In such a situation, the parameters and model of the previous camera are not usable for performing the logo insertion in the new video frame. In order to ensure that the logo appears in the new video frame seamlessly and realistically, the camera of the new video frame must be identified while avoiding delays that would allow an ordinary observer to notice an interruption in the display of the virtual logo or indicia.

In step 405, the above-mentioned characteristic features are extracted from the current video frame. The extracted characteristic features need not encompass every feature category identified above, but depending on the specific implementation may comprise a subset of such features. For instance, background color can be used to segment structural features such as lines, curves, or blobs that may contain graphics or text, etc. Local point features may be extracted directly from single color channel, for example, the luma channel.

In step 410, the features extracted from the current frame are compared with the available features from the feature database 316. (It is pre-determined that there are enough features for a reliable homography estimation.) In step 415, a known in the art method, such as RANSAC, may be employed to compute the homography based on the corresponding feature pairs. Next, using known in the art methods (for example: "A Flexible New Technique for Camera Calibration", by Zhang Z., IEEE Trans. On Pattern Analysis and Machine Intelligence, Vol. 22, No. 11, November 2000), based on the previously estimated homography, a camera model, Cam, is estimated in step 420. The Cam estimate includes dynamic information such as camera's pan, tilt, rotation, and zoom, as well as, static information such as the fixed camera's location.

In step 425 the estimated camera location is compared with all system cameras' locations. If this estimated camera location can be matched within a predetermined threshold to one of the known system camera's location then this camera is selected to be the camera from which the current video frame is captured. This identification is usually more successful when the cameras are sparsely located at the event. Otherwise, the method proceeds to step 435, typically when some of the cameras are more closely located. For example, cameras may be positioned as close as 6 feet apart in filming a rugby match. Depending on the extent of camera movements (zoom, pan, tilt) in a specific application, the effective camera location or the center of projection changes and differentiating among closely positioned cameras may be a challenge. Typically, a proper threshold (e.g. 10 feet) is recommended for camera deployment. If the camera identity can be determined based on meeting the threshold requirements of step 425, the selected camera's location is used to refine the current Cam estimate in step 460.

Otherwise, if the camera identity cannot be determined with certainty using the thresholds identified in step 425, for each one of those cameras that are in dispute the camera model is re-estimated, this time using each respective known camera's location. As described above, the cameras that are not identified in step 425 may be the small subset of all cameras that are closely located. When estimating the camera model for camera n, for example, the known camera n location is used. Hence, step 435 yields N results for $Cam_n$. Next, in step 440, an error, En, is calculated with respect to each camera: 1) features associated with camera n 316 are mapped back, using the estimated camera model, $Cam_n$, onto the current frame space, and 2) their distance to their corresponding features from the current frame is measured resulting En. (More details for the calculation of En are provided below.) Note that, when calculating the camera model in step 420 the camera's position is explicitly estimated, while when calculating the camera models in step 435 known camera locations are used to calculate the respective camera models. At this point, there are N calculated errors with respect to each camera: {E1 . . . EN}. Thus, if the smallest En is below a given threshold 445, the respective camera is selected as the camera associated with the current video frame 450 and the respective $Cam_n$ is the resulted camera model 450.

The error, En, represents the distance between corresponding features (or the lack of similarity). This error metric depends on the type of the feature. For example, for geometric features, such as points, an error may be defined as the Euclidean distance between corresponding points, while for geometric features, such as conics, an error may be defined as the average Euclidean distance calculated based on the Euclidean distances between each point on one conic and the closest point to it on the corresponding second conic. Where a feature is defined by the color or texture of an image region, various metrics known in the art may be used (e.g. normalized correlation, mutual information, color histogram matching).

Error in image space is specified in pixels. Error can also be measured in 3D space by back-projecting the identified features in 2D screen to 3D such that it can be measured in analog units such as feet or inches. For example, in the case of line features in a football field, if the total error between all projected and measured candidates is less than an acceptable accuracy of several inches, it will be considered as a good match.

Otherwise, other available information may be used to determine the camera identity 455. For example, view-specific features like graphics or texts that are physically posted on the field may be used. The location, shape or content of these features may be unique to a specific camera and may be used to verify the camera selected. For example, if a graphic or letter's characteristics (e.g. shape and color) that is projected onto an image has an 80% match of all pixels, it would be considered a good verification of the selected camera.

Once the correct camera has been identified together with its associated camera model estimate, the LVIS 300 may proceed to insert the desired indicia into the program video. For example, the warping unit 328 in the back-end component of the system uses the camera model to warp the given indicia to match the current camera perspective. Then, the warped indicium image is mixed 324 with the current frame image taking into account occlusion 322. The back-end component may function in the way described in U.S. Pat. Nos. 5,264,933, 5,491,517, and 5,543,856 to insert the indicia into the video frame. The video scene including the inserted indicia may then be the output from the LVIS 300.

As explained above, by automatically identifying the camera producing the current video frame, the LVIS 300 can use the correct camera parameters and camera model to ensure that the desired indicia are inserted in the correct pose and modified according to the appropriate occlusion settings and warping factors. Moreover, the insertion is accomplished much more rapidly than if a human operator was charged with the task of identifying the correct camera and manually entering its ID into the LVIS 300. For example, the exemplary embodiments of automatic camera identification described herein will typically complete the camera identification in 1/60 sec, while human input will normally take more than 1 second. Since the camera is identified significantly more quickly, the insertion can be accomplished within a short enough time after a scene cut that an ordinary observer viewing the broadcast program does not notice any delays between the occurrence of the scene cut and the appearance of the virtual logo in the image.

Throughout this description, it has been described that the automatic camera identification may be used for the purposes of appropriate indicia insertion into the video frames. However, this automatic camera identification is not limited to only this type of application. The automatic camera identification may be used for any purposes. For example, in any case where a broadcaster desires to add any type of post-processing after production, the identification that a video segment is originated by a particular camera may be useful.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. The hardware platform may also be a standard video processing platform and its associated hardware and software components. In a further example, the exemplary embodiments of the automatic camera identification may be a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
    receiving a current video frame of a program video having a plurality of scene cuts switching between video segments originating from respective cameras of a plurality of cameras;
    automatically identifying the camera from which the current video frame originated;
    extracting features from the current video frame;
    comparing the features to previously stored features; and
    estimating a camera model based on corresponding feature pairs.

2. The method according to claim 1, wherein estimating the camera model includes computing a homography based on the corresponding feature pairs.

3. The method according to claim 1, wherein the camera model includes static camera parameters.

4. The method according to claim 1, further comprising:
    determining whether the estimated camera model is within a predetermined threshold of any stored camera models for the plurality of cameras; and
    identifying the camera from which the current video frame originated if the estimated camera model is within the predetermined threshold of the stored camera model for the camera, wherein the stored camera model includes camera static parameters.

5. The method according to claim 4, further comprising:
    refining the estimated camera model using the stored camera model if the estimated camera model is within the predetermined threshold of the stored camera model.

6. The method according to claim 4, further comprising:
    estimating, when the estimated camera model is not within a predetermined threshold of any stored camera models for the plurality of cameras, a new camera model for each of the plurality of cameras based on the stored camera model for each of the cameras, wherein the static camera parameters include a known camera location.

7. The method according to claim 6, further comprising:
    calculating an error value for each camera, wherein the error is determined by a metric that measures the distance between features extracted from the video frame and projected pre-determined features from a database, and wherein projection is based on the new camera model.

8. The method according to claim 7, further comprising:
    identifying the camera having the smallest error value as the camera from which the current video frame originated.

9. The method of claim 1, further comprising:
    inserting indicia into the current video frame based on the identity of the camera.

10. An apparatus, comprising:
    a feature database storing predetermined features for a plurality of cameras filming a program video having a plurality of scene cuts switching between video segments originating from respective cameras of the plurality of cameras;
    a recognition unit receiving a current video frame of the program video, extracting features from the current video frame, and comparing the features to the previously stored features; and a camera model estimator computing an estimated camera model based on corresponding feature pairs from the extracted features and previously stored features, wherein if the estimated camera model is within a predetermined threshold of a stored camera model for one of the plurality of cameras, the one of the cameras is identified as the camera from which the current video frame originates.

11. The apparatus according to claim 10, wherein the apparatus is located downstream of a production switcher used to generate the program video.

12. The apparatus according to claim 10, wherein the camera model estimator further estimates, when the estimated camera model is not within the predetermined threshold of any stored camera models for the plurality of cameras, a new camera model for each of the plurality of cameras based on known static camera parameters.

13. The apparatus according to claim 12, wherein the camera model estimator further calculates an error value for each camera, wherein the error is determined by a metric that measures the distance between features extracted from the video frame and projected pre-determined features from a database, and wherein projection is based on the new camera model, and identifies the camera having the smallest error value as the camera from which the current video frame originated.

14. The apparatus according to claim 13, wherein the error value is based on one of a Euclidean distance, a normalized correlation, a mutual information, a color histogram matching and a number of pixels.

15. The apparatus according to claim 10, further comprising:
a back-end processing arrangement inserting an indicia into the current video frame based on the identity of the camera.

16. The apparatus according to claim 11, wherein the apparatus is located in a central production facility remotely located from the production switcher.

17. A non-transitory computer readable storage medium including a set of instructions that are executable by a processor, the set of instructions, the set of instructions, when executed, causing the processor to:
receive a current video frame of a program video having a plurality of scene cuts switching between video segments originating from respective cameras of a plurality of cameras;
automatically identify the camera from which the current video frame originated;
extract features from the current video frame;
compare the features to previously stored features; and
estimating a camera model based on corresponding feature pairs.

18. The non-transitory computer readable storage medium of claim 17, wherein the set of instructions further cause the processor to:
determine whether the estimated camera model is within a predetermined threshold of any stored camera models for the plurality of cameras; and
identify the camera from which the current video frame originated if the estimated camera model is within the predetermined threshold of the stored camera model for the camera.

19. The non-transitory computer readable storage medium of claim 18, wherein the set of instructions further cause the processor to:
estimate, when the estimated camera model is not within a predetermined threshold of any stored camera models for the plurality of cameras, a new camera model for each of the plurality of cameras based on the stored camera model for each of the cameras, wherein the static camera parameters include a known camera location;
calculate an error value for each camera, wherein the error is determined by a metric that measures the distance between features extracted from the video frame and projected pre-determined features from a database, and wherein projection is based on the new camera model; and
identify the camera having the smallest error value as the camera from which the current video frame originated.

* * * * *